(12) United States Patent
Xu

(10) Patent No.: US 8,896,214 B2
(45) Date of Patent: Nov. 25, 2014

(54) LED DRIVING SYSTEM FOR DRIVING MULTI-STRING LEDS AND THE METHOD THEREOF

(75) Inventor: Peng Xu, Los Altos, CA (US)

(73) Assignee: Monolithic Power Systems, Inc., San Jose, CA (US)

( * ) Notice: Subject to any disclaimer, the term of this patent is extended or adjusted under 35 U.S.C. 154(b) by 261 days.

(21) Appl. No.: 13/330,490

(22) Filed: Dec. 19, 2011

(65) Prior Publication Data

US 2013/0154484 A1   Jun. 20, 2013

(51) Int. Cl.
*H05B 37/02* (2006.01)

(52) U.S. Cl.
USPC ........ 315/122; 315/185 R; 315/186; 315/192; 315/291; 315/307

(58) Field of Classification Search
USPC ............. 315/122, 185 R, 186, 192, 193, 247, 315/291, 307, 308
See application file for complete search history.

(56) References Cited

U.S. PATENT DOCUMENTS

| 8,373,346 | B2 * | 2/2013 | Hoogzaad et al. | 315/185 R |
| 2010/0164403 | A1 * | 7/2010 | Liu | 315/297 |
| 2010/0283322 | A1 * | 11/2010 | Wibben | 307/31 |
| 2011/0101885 | A1 | 5/2011 | Yang | |
| 2011/0148323 | A1 * | 6/2011 | Yao et al. | 315/295 |
| 2011/0194214 | A1 | 8/2011 | Yao et al. | |
| 2011/0227497 | A1 | 9/2011 | Hu et al. | |
| 2011/0234122 | A1 | 9/2011 | Yu et al. | |
| 2012/0049741 | A1 | 3/2012 | Ye et al. | |
| 2012/0049761 | A1 | 3/2012 | Yu et al. | |
| 2012/0098442 | A1 * | 4/2012 | Jin | 315/188 |
| 2012/0104964 | A1 | 5/2012 | Hughes | |

FOREIGN PATENT DOCUMENTS

CN   201110035189   6/2011

* cited by examiner

*Primary Examiner* — Douglas W Owens
*Assistant Examiner* — Thai Pham
(74) *Attorney, Agent, or Firm* — Perkins Coie LLP

(57) ABSTRACT

A LED driving system comprising: an input port to receive an input signal; a switch node to provide a switching signal; an energy storage component coupled between the input port and the switch node; a main switch coupled between the switch node and ground; n output lines coupled in parallel, and each output line having a first and second terminals, and wherein the first terminal is coupled to the switch node, and the second terminal is coupled the reference ground, and wherein each output line having an output switch, a diode and a LED string coupled in series between the first and second terminals, and wherein each output line having a capacitor coupled in parallel with the LED string; and a controller providing a control signal to the main switch and providing corresponding n control signals to the corresponding n output switches in the corresponding n output lines.

16 Claims, 14 Drawing Sheets

LED DRIVING SYSTEM FOR DRIVING MULTI-STRING LEDS AND THE METHOD THEREOF

TECHNICAL FIELD

The present disclosure relates to electrical circuit, more particularly, the present disclosure relates to LED drivers.

BACKGROUND

LED backlighting is widely used for LCD TVs and monitors where multi strings of LEDs are mounted either at edge or directly on the back of screens. Typically, one LED string may contain 100 LEDs coupled in series.

FIG. 1 is a schematic circuit of a prior art LED driving system 10 which uses one LED driver to drive n LED strings, wherein n is a desired string number, e.g. n=6. The LED driver adopts linear current sources to balance the LED current between different LED strings. The LED driver includes a power stage to provide an output voltage to drive the LED strings 15_1, 15_2, ..., 15_n. Each LED string 15_i is series coupled with a corresponding switch 16_i and a corresponding resistor 17_i between the output port of the power stage and a reference ground, wherein i is an integer from 1 to n. The power stage comprises an inductor 11, a diode 12, a switch 13, and an output capacitor 14 connected as shown. The LED driver further comprises a controller 18 which controls the switch 13 to operate in the switch mode, and controls the switch 16_i operate in the linear mode. Through such control, each LED string is regulated to be in the desired mode of operation.

However, the efficiency of the LED driving system 10 is low due to the linear operation of switches 16_1~16_n, which also causes thermal and long term reliability issues for large screen applications.

FIG. 2 illustrates a schematic circuit of another prior art LED driving system 20 which uses n LED drivers to drive n LED strings, wherein n is a natural number. Compared to the LED driving system 10, the LED driving system 20 has higher efficiency. However, the LED driving system 20 needs many inductors and controllers, which results in higher cost.

SUMMARY

It is an object of the present disclosure to provide a LED driving system with higher efficiency and lower cost.

In accomplishing the above and other objects, there has been provided, in accordance with an embodiment of the present disclosure, a LED driving system for driving multi-string LEDs, comprising: an input port configured to receive an input signal; a switch node configured to provide a switching signal; an energy storage component coupled between the input port and the switch node; a main switch coupled between the switch node and a reference ground; n output lines coupled in parallel, wherein n is a natural number, and each output line having a first terminal and a second terminal, and wherein the first terminal is coupled to the switch node, and the second terminal is coupled the reference ground, and wherein each output line having an output switch, a diode and a LED string coupled in series between the first and second terminals, and wherein each output line having a capacitor coupled in parallel with the LED string; and a controller configured to provide a control signal to the main switch and to provide corresponding n control signals to the corresponding n output switches in the corresponding n output lines.

In addition, there has been provided, in accordance with an embodiment of the present disclosure, a LED driving system, comprising: an input port configured to receive an input signal; a power converter comprising a main switch operating at on and off states, wherein the power converter is coupled to the input port to receive the input signal, and wherein based on the on and off states of the main switch and the input signal, the power converter generates a driving voltage; n output lines coupled in parallel to form a first terminal and a second terminal, wherein n is a natural number, and wherein the first terminal is coupled to the power converter to receive the driving voltage, and each output line comprises: a LED string and an output switch coupled in series between the first terminal and the second terminal of each output line; and a capacitor coupled in parallel with the LED string; a current sense resistor coupled between the second terminal of the n output lines and a reference ground to generate a current sense signal indicative of a current flowing through the LED string; and a controller coupled to the current sense resistor to receive the current sense signal, and wherein based on the current sense signal, the controller generates control signals to control the main switch and the output switches operate at on and off states to regulate the current flowing through each LED string to be balanced.

Furthermore, there has been provided, in accordance with an embodiment of the present disclosure, a method for driving multi-string LEDs, comprising: deriving a current sense signal indicative of a current flowing through the LEDs; generating a control signal in response to the current sense signal; converting an input signal to a switching signal by controlling a main switch operate between on and off states; converting the switching signal to n driving voltages by controlling n output switches operate between on and off states, wherein n is the LED string number, and wherein each output switch is coupled in series with each LED string; and driving each LED string by the driving voltage; wherein the main switch and the output switches are controlled by the control signal.

The use of the similar reference label in different drawings may indicate the same or like components.

DETAILED DESCRIPTION

Embodiments of circuits for LED driving systems with higher efficiency and lower cost are described in detail herein. In the following description, some specific details, such as example circuits for these circuit components, are included to provide a thorough understanding of embodiments of the disclosure. One skilled in relevant art will recognize, however, that the disclosure can be practiced without one or more specific details, or with other methods, components, materials, etc.

The following embodiments and aspects are illustrated in conjunction with circuits and methods that are meant to be exemplary and illustrative. In various embodiments, the above problem has been reduced or eliminated, while other embodiments are directed to other improvements.

Figure 1:
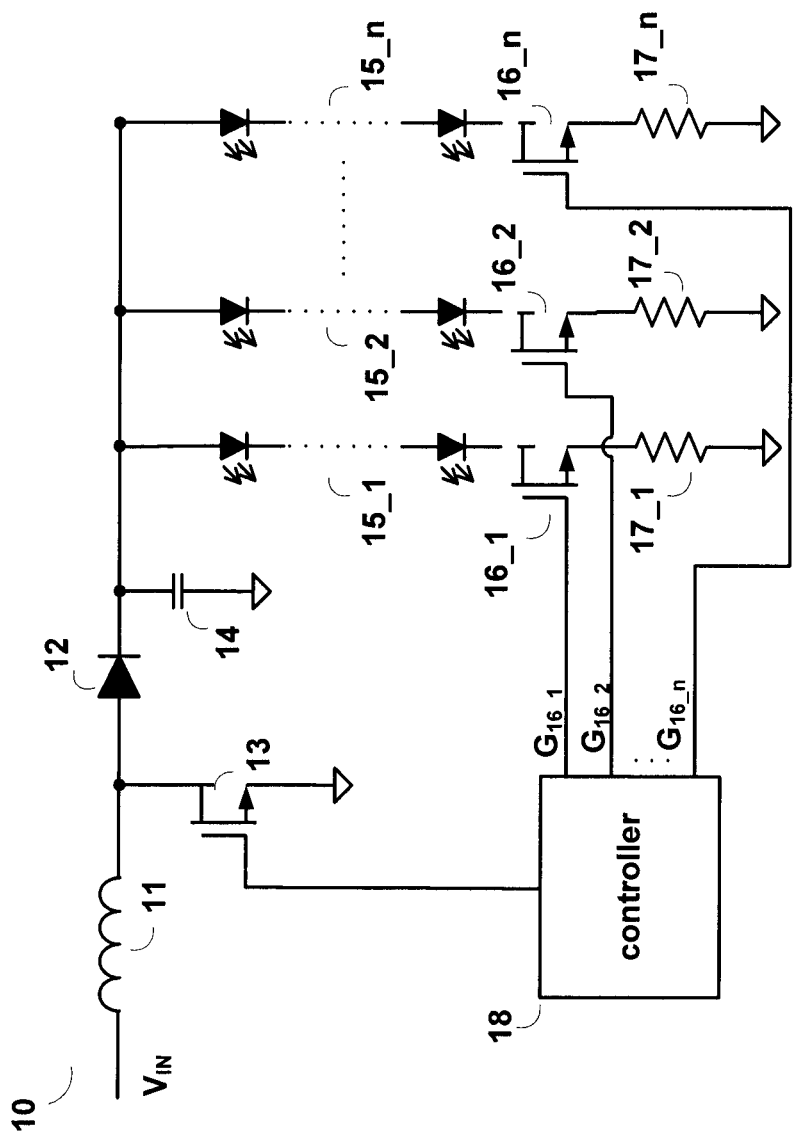
FIG. 1 illustrates a schematic circuit of a prior art LED driving system 10 which uses one LED driver 10 to drive n LED strings.
Figure 2:
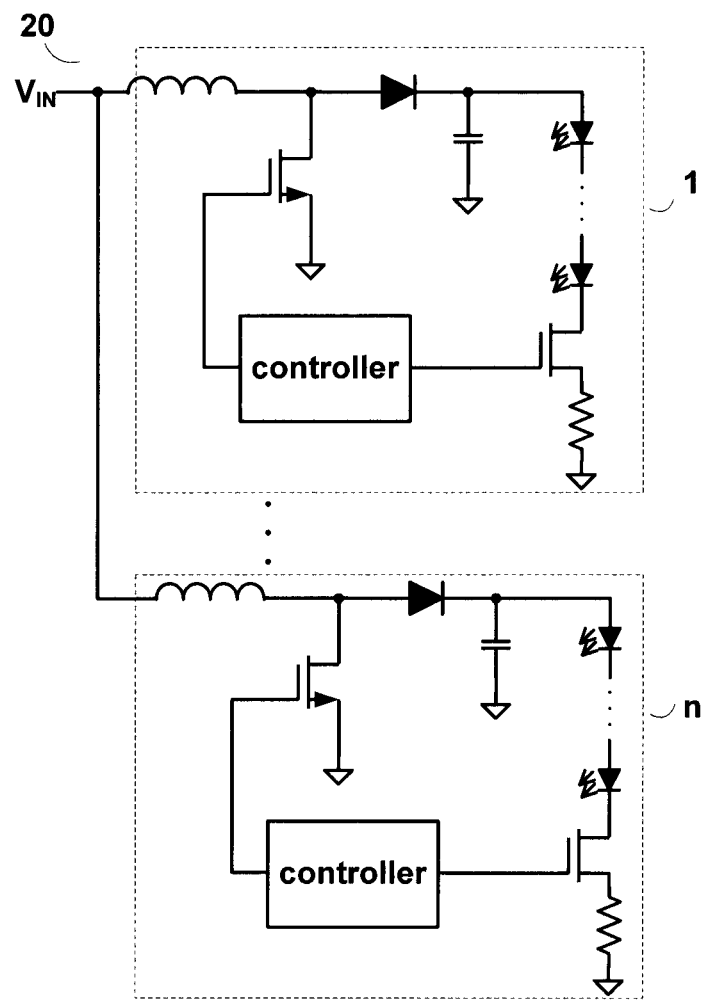
FIG. 2 illustrates a schematic circuit of another prior art LED driving system 20 which uses n LED drivers to drive n LED strings.
Figure 3:
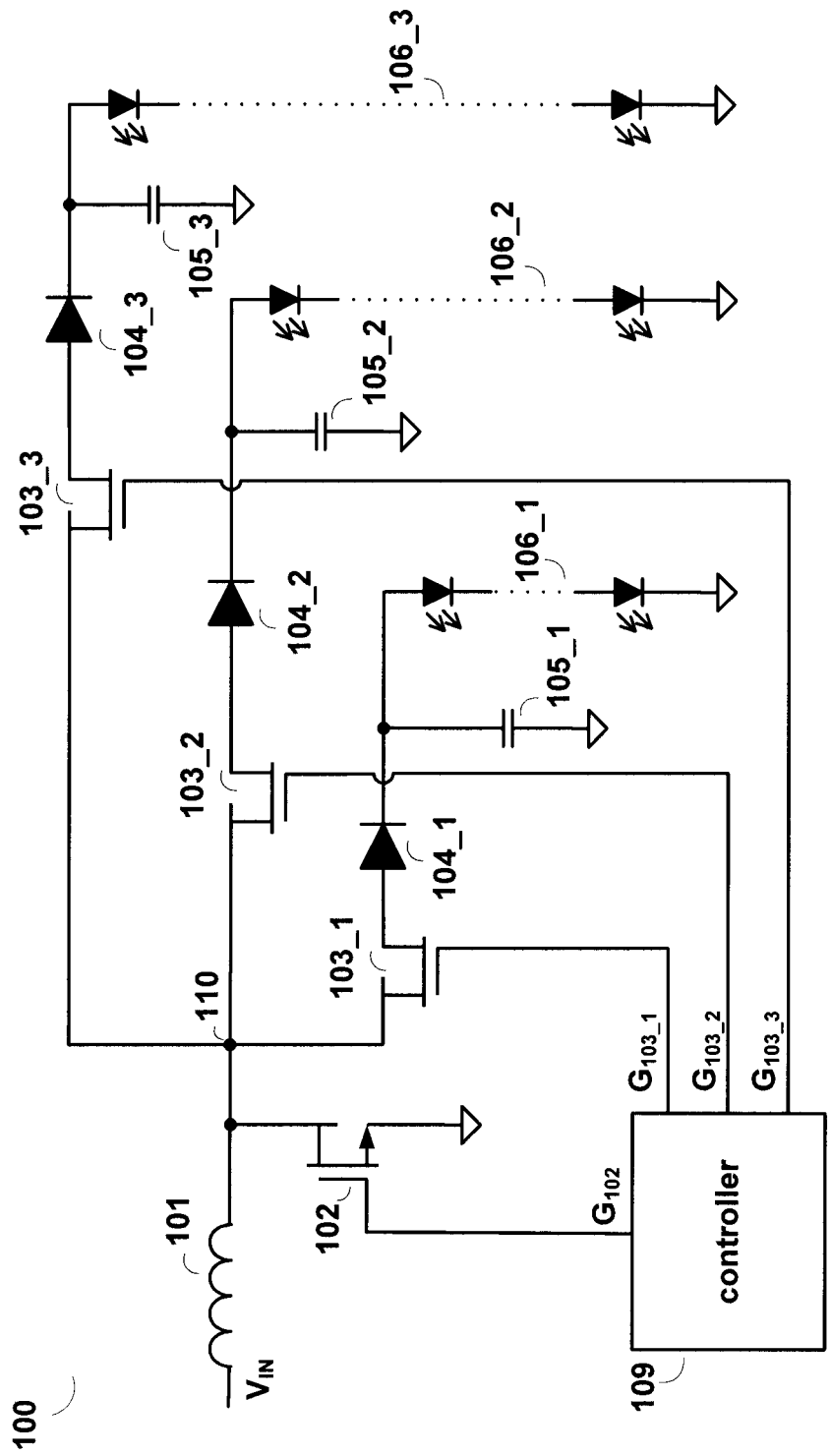
FIG. 3 illustrates a schematic circuit of a LED driving system 100 in accordance with an embodiment of the present disclosure.

FIG. 3 illustrates a schematic circuit of a LED driving system 100 in accordance with an embodiment of the present disclosure. The LED driving system 100 comprises: an input port configured to receive an input signal ($V_{IN}$); a switch node 110 configured to provide a switching signal; an energy storage component 101 coupled between the input port and the switch node 110; a main switch 102 coupled between the switch node 110 and a reference ground; n output lines coupled in parallel, wherein n is a natural number, wherein each output line having a first terminal and a second terminal, and wherein the first terminal is coupled to the switch node 110, and the second terminal is coupled a reference ground; and a controller 109 configured to provide control signals to the main switch 102 and to switches in the n output lines; wherein each output line comprises: an output switch 103_$i$, a corresponding diode 104_$i$ and a corresponding LED string 106_$i$ coupled in series, and a corresponding capacitor 105_$i$ coupled in parallel with the corresponding LED string 106_$i$, wherein i is an integer from 1 to n. In the example of FIG. 3, the output switch 103_$i$ is configured to be a high-side output switch. In the example of FIG. 3, the LED driving system 100 drives 3 LED strings. However, one skilled in the art should realize that the LED driving system 100 may drive any desired number of LED strings, e.g., 6 LED strings, 8 LED strings, etc. Each LED string may contain a number of LEDs, e.g., 100 LEDs.

In one embodiment, diode 104_$i$ may be replaced by a power switch.

In one embodiment, the energy storage component 101 comprises an inductor.

Following are two control schemes that may be applied to the LED driving system 100 when the LED driving system 100 is in operation.

If the LED driving system 100 operates in discontinuous current mode (DCM) or boundary mode, the following first control scheme may be applied: the main switch 102 and the output switch 103_$i$ are turned on alternatively. That is, for example when n=3, the turn-on order of these switches is: the main switch 102, the first output switch 103_1, the main switch 102, the second output switch 103_2, the main switch 102, and the third output switch 103_3; then repeat.

Figure 4:
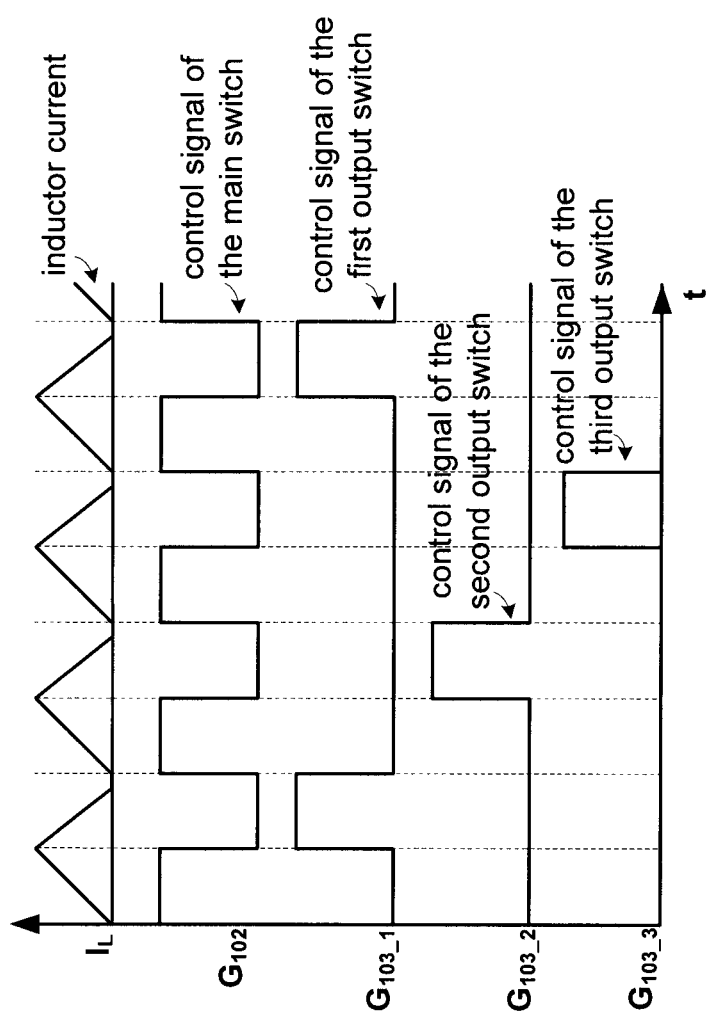
FIG. 4 illustrates waveforms of the control signal of the main switch, the control signals of the output switches, and the inductor current when the first control scheme is applied to the LED driving system 100 in FIG. 3.

The corresponding waveforms of the control signal ($G_{102}$) of the main switch 102, the control signals ($G_{103\_1}$~$G_{103\_3}$) of the output switches 103_1~103_3, and the inductor current ($I_L$) are shown in FIG. 4 when the first control scheme is applied to the LED driving system 100.

The following second control scheme may be applied when the LED driving system 100 operates in all modes: the main switch 102 and the output switches 103_1~103_3 are turned on one by one. That is, the turn-on order of them is: the main switch 102, the first output switch 103_1, the second output switch 103_2, and the third switch 103_3; then repeat.

Figure 5:
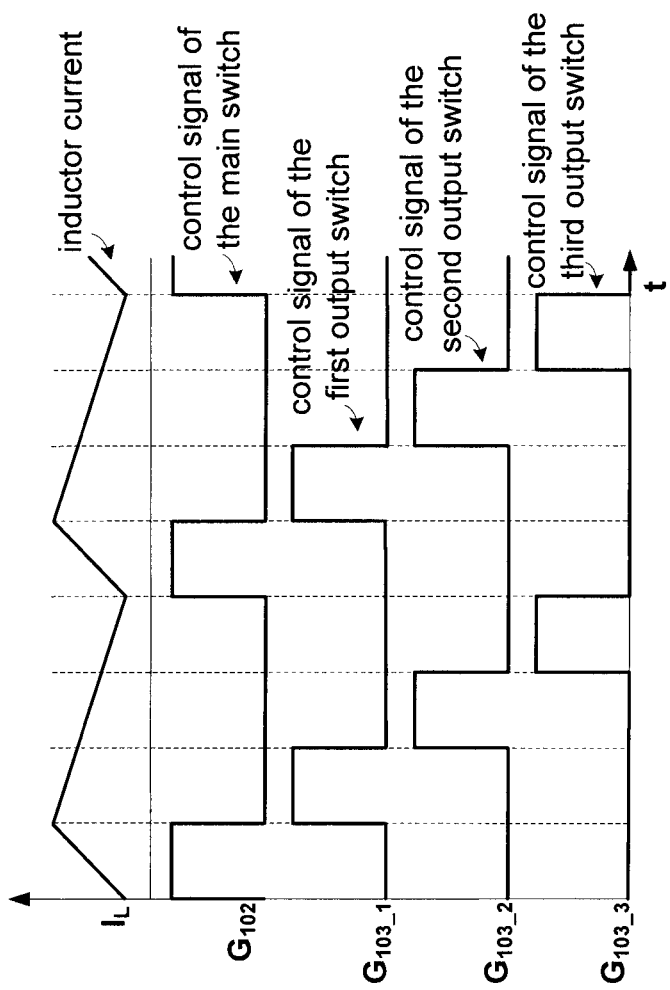
FIG. 5 illustrates waveforms of the control signal of the main switch, the control signals of the output switches, and the inductor current when the second control scheme is applied to the LED driving system 100 in FIG. 3.

The corresponding waveforms of the control signal ($G_{102}$) of the main switch 102, the control signals ($G_{103\_1}$~$G_{103\_3}$) of the output switches 103_1~103_3, and the inductor current ($I_L$) are shown in FIG. 5 when the second control scheme is applied to the LED driving system 100.

Figure 6:
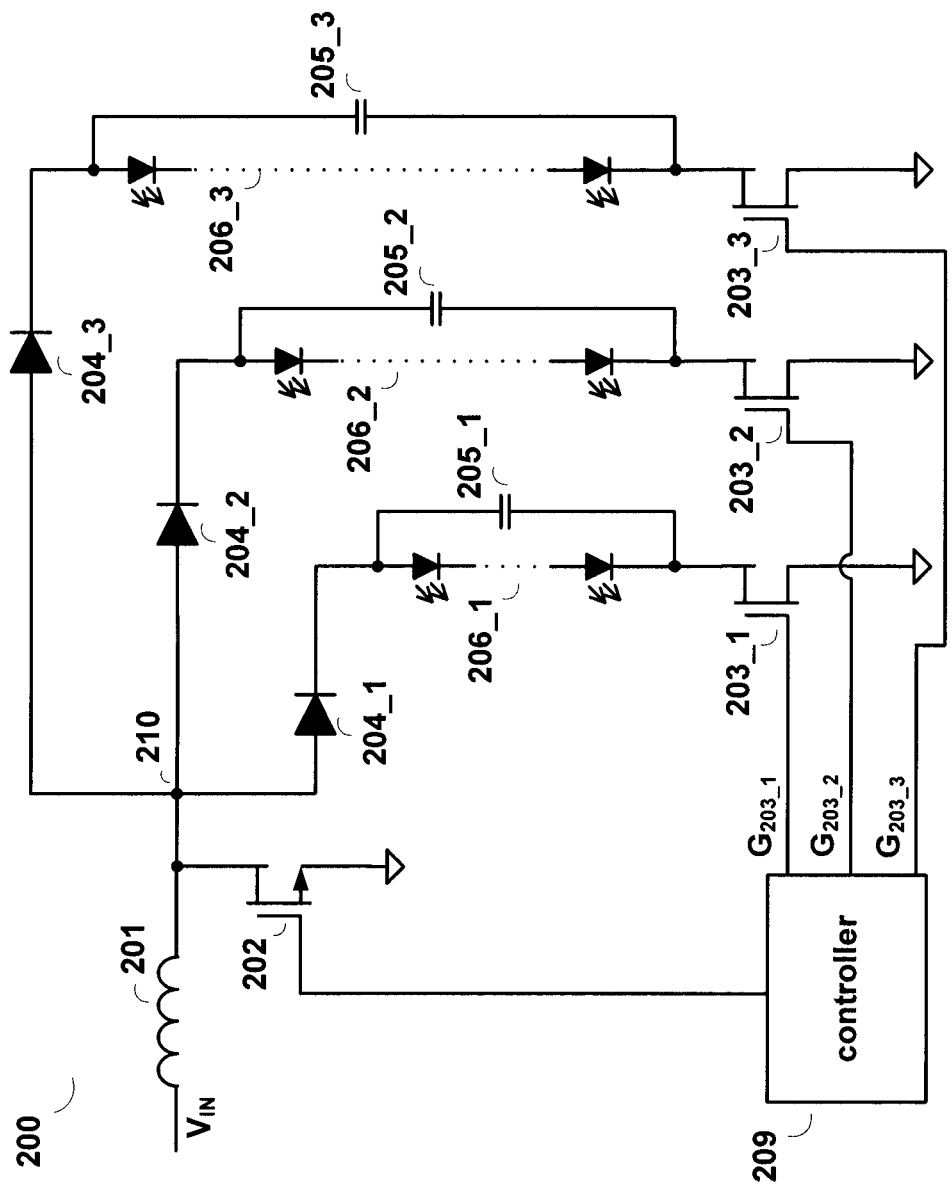
FIG. 6 illustrates a schematic circuit of a LED driving system 200 in accordance with an embodiment of the present disclosure.

FIG. 6 illustrates a schematic circuit of a LED driving system 200 in accordance with an embodiment of the present disclosure. The LED driving system 200 is similar to the LED driving system 100 in FIG. 3. Different to the LED driving system 100 in FIG. 3, the output switch 203_$i$ in the LED driving system 200 in FIG. 6 is configured to be a low-side output switch, while the output switch 103_$i$ in the LED driving system 100 in FIG. 3 is configured to be a high-side output switch.

Figure 7:
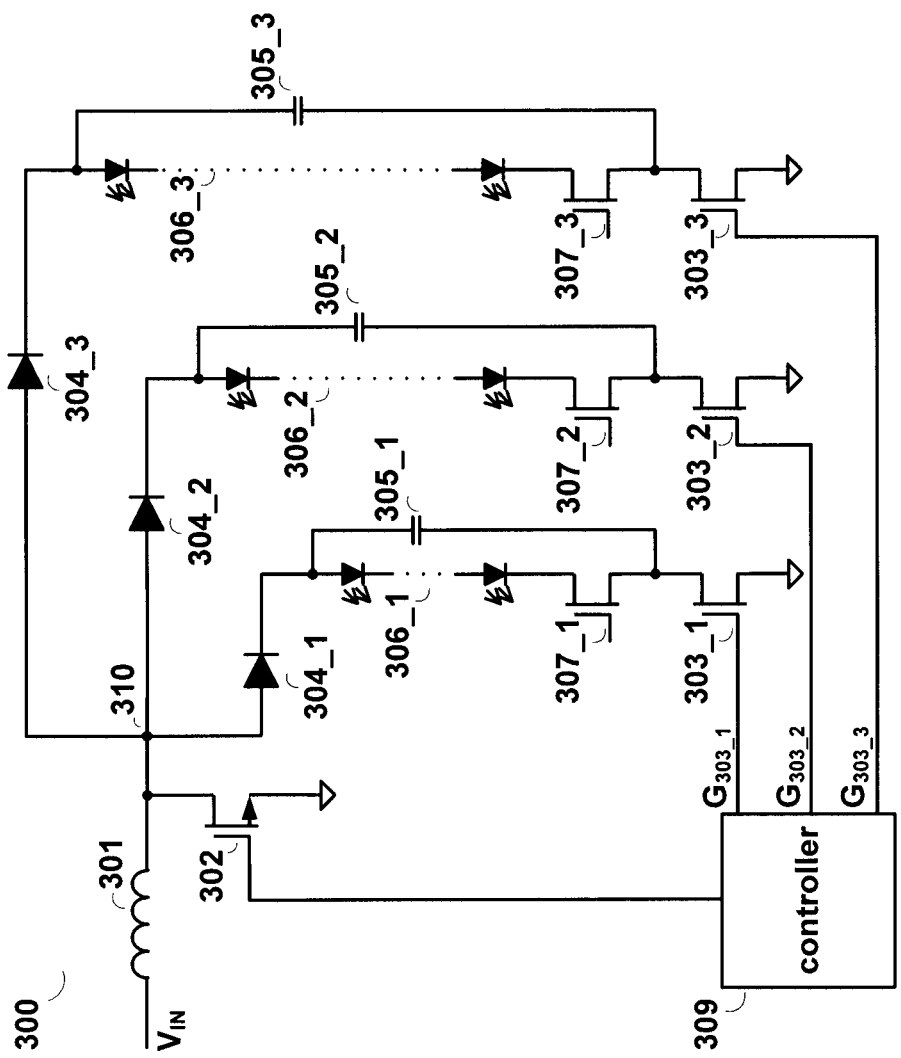
FIG. 7 illustrates a schematic circuit of a LED driving system 300 in accordance with an embodiment of the present disclosure.

FIG. 7 illustrates a schematic circuit of a LED driving system 300 in accordance with an embodiment of the present disclosure. In the example of FIG. 7, each output line further comprises a dimming switch 307_$i$ coupled in series with the LED string 306_$i$, wherein the series coupled LED string 306_$i$ and dimming switch 307_$i$ is coupled in parallel with the capacitor 305_$i$. The dimming switch 307_$i$ may be controlled by a PWM signal provided by the controller 309 (not shown) to get the corresponding LED string 306_$i$ dimmed.

Figure 8:
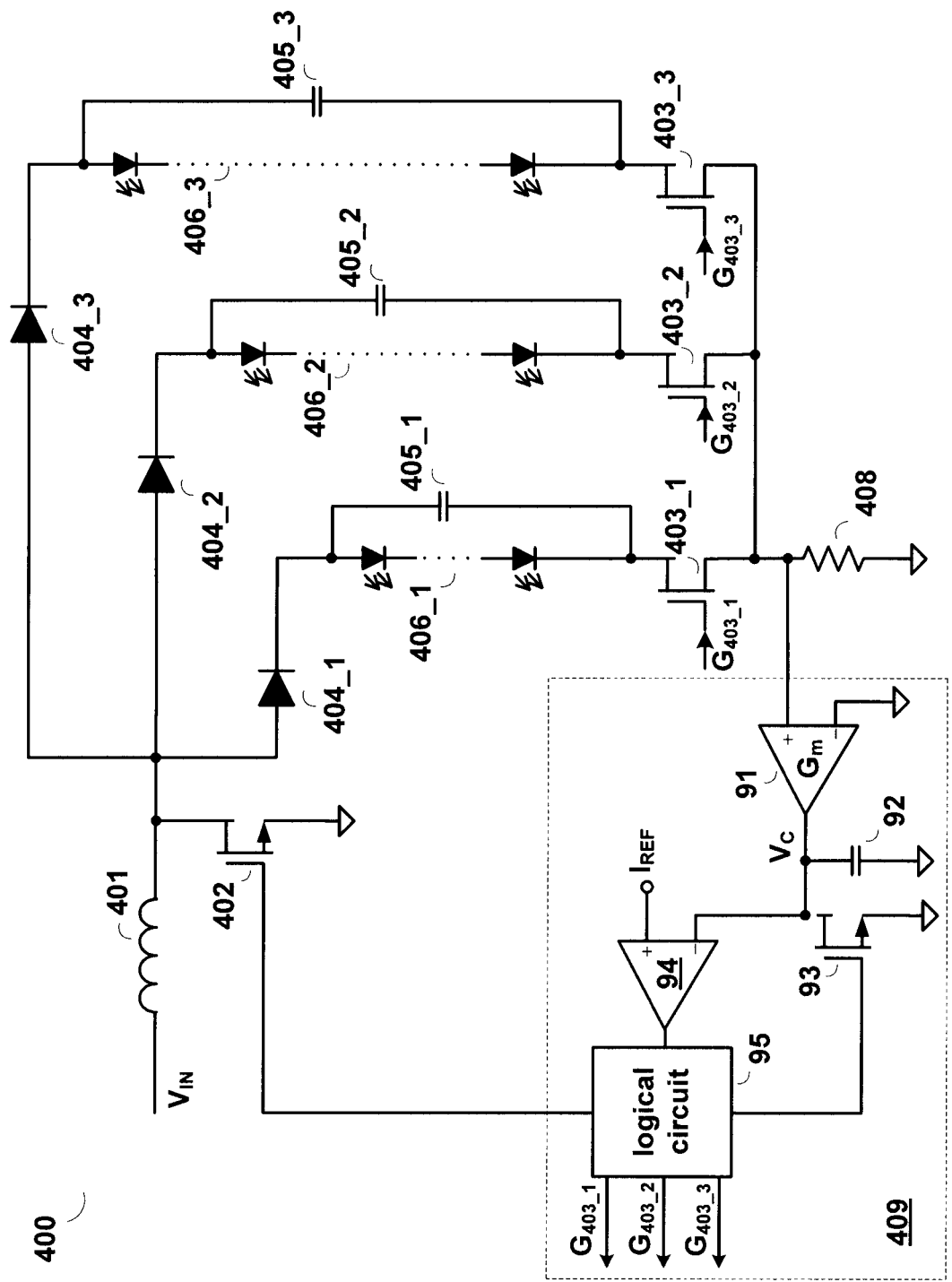
FIG. 8 illustrates a schematic circuit of a LED driving system 400 with a controller 409 in accordance with an embodiment of the present disclosure.

FIG. 8 illustrates a schematic circuit of a LED driving system 400 with a controller 409 in accordance with an embodiment of the present disclosure. In the example of FIG. 8, the LED driving system 400 further comprises a current sense resistor 408 coupled between the second terminal of each output line and the reference ground to provide a current sense signal indicative of a current flowing through the LED string 406_$i$ when the corresponding output switch 403_$i$ is on.

In the example of FIG. 8, the controller 409 comprises: a transconductance amplifier 91 having a first input terminal, a second input terminal, and an output terminal, wherein the first input terminal is coupled to the current sense resistor 408 to receive the current sense signal, the second input terminal is coupled to the reference ground, wherein based on the current sense signal, the transconductance amplifier 91 generates an amplified signal; an integrated capacitor 92 coupled to the output terminal of the transconductance amplifier 91 to receive the amplified signal, so as to generate an integrated signal $V_C$; a reset switch 93 coupled in parallel with the integrated capacitor 92 to reset the integrated signal $V_C$ to be zero when the integrated signal $V_C$ reaches a current reference signal $I_{REF}$; a comparator 94 having a first input terminal, a second input terminal and an output terminal, wherein the first input terminal is coupled to integrated capacitor 92 to receive the integrated signal $V_C$, the second terminal is configured to receive the current reference signal $I_{REF}$, wherein based on the integrated signal $V_C$ and the current reference signal $I_{REF}$, the comparator 94 generates a comparison signal; and a logical circuit 95 coupled to the comparator 94 to receive the comparison signal, and wherein based on the comparison signal, the logical circuit 95 generates control signals to control the reset switch 93, the main switch 402, and the output switch 403_i.

When the LED driving system 400 is in operation, if the first control scheme is applied, i.e., the main switch 402 and the output switch 403_i are turned on alternately. When the main switch 402 is on and the output switch 403_i is off, the inductor current $I_L$ starts to increase, and there is no current flowing through the current sense resistor 408, so the current sense signal is zero. When one output switch 403_i is on and the main switch 402 is off, the inductor current $I_L$ starts to decrease, and the current flowing through the output switch 403_i jumps to the peak inductor current at the very time point when the output switch 403_i is on. Then the current flowing through the output switch 403_i starts to decrease from the peak inductor current to zero. So the integrated signal $V_C$ starts to increase from zero, and the slope of the integrated signal decreases. When the integrated signal $V_C$ reaches the current reference $I_{REF}$, the comparison signal generated by the comparator 94 is logical low. Accordingly, the reset switch 93 is turned on to reset the integrated capacitor 92. As a result, integrated signal $V_C$ is reset. At the meantime, the logical circuit will send control signals to control the switches in the LED driving system 400.

Figure 9:
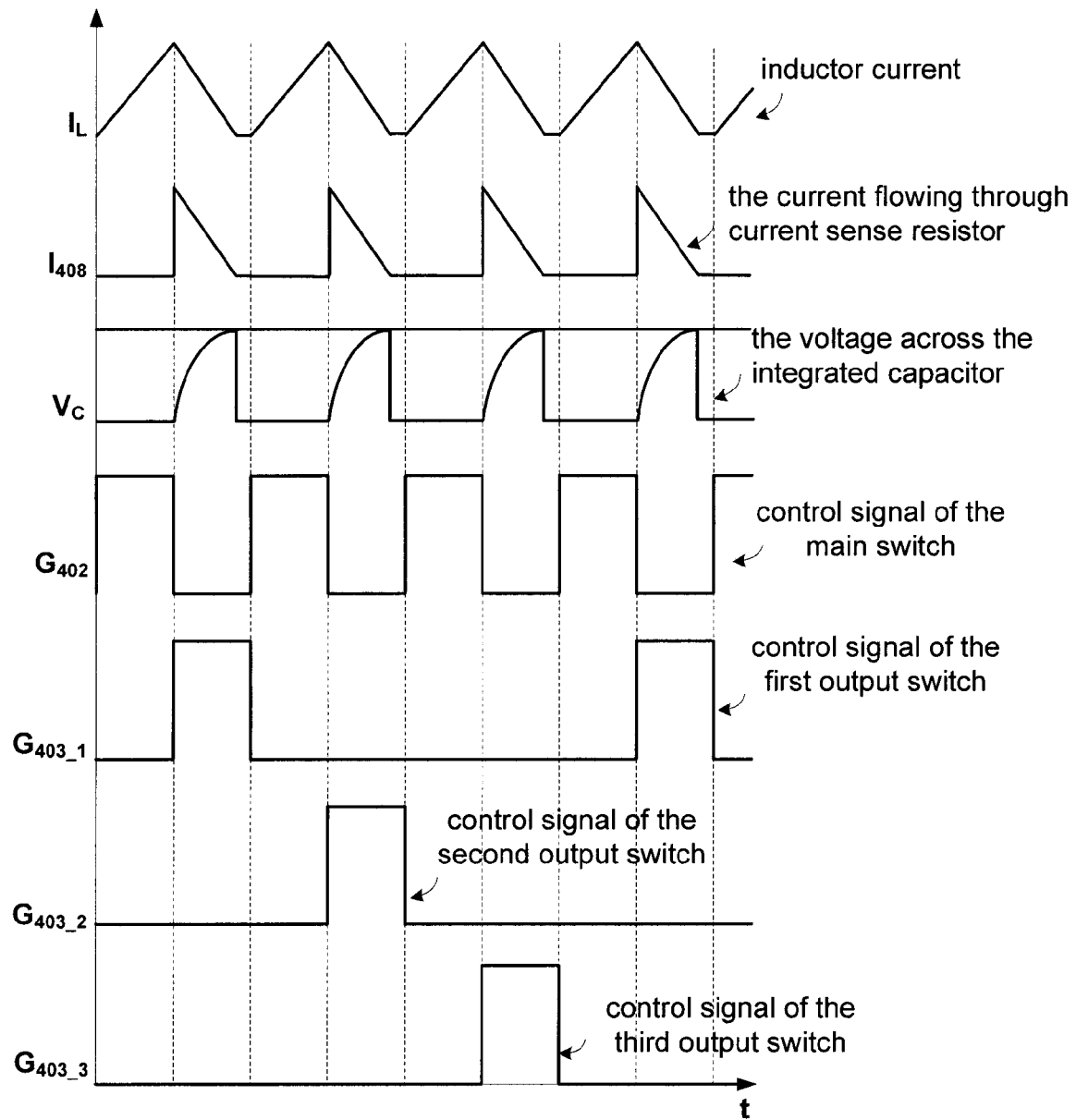
FIG. 9 illustrates waveforms of the inductor current ($I_L$), the current flow through the resistor ($I_{408}$), the voltage across the integrated capacitor ($V_C$), the control signal of the main switch ($G_{402}$), and the control signals ($G_{403\_1}$, $G_{403\_2}$, and $G_{403\_3}$) of the output switches when the LED driving system 400 in FIG. 8 operates under the first control scheme in DCM or boundary mode in accordance with an embodiment of the present disclosure.

The waveforms of the inductor current ($I_L$), the current flowing ($I_{408}$) through the current sense resistor 408, the integrated signal ($V_C$), the control signal ($G_{402}$) of the main switch 402, and the control signals ($G_{403\_1}$~$G_{403\_3}$) of the output switches 403_1~403_3 are shown in FIG. 9 when the LED driving system 400 operates under the first control scheme in DCM and boundary mode.

Figure 10:
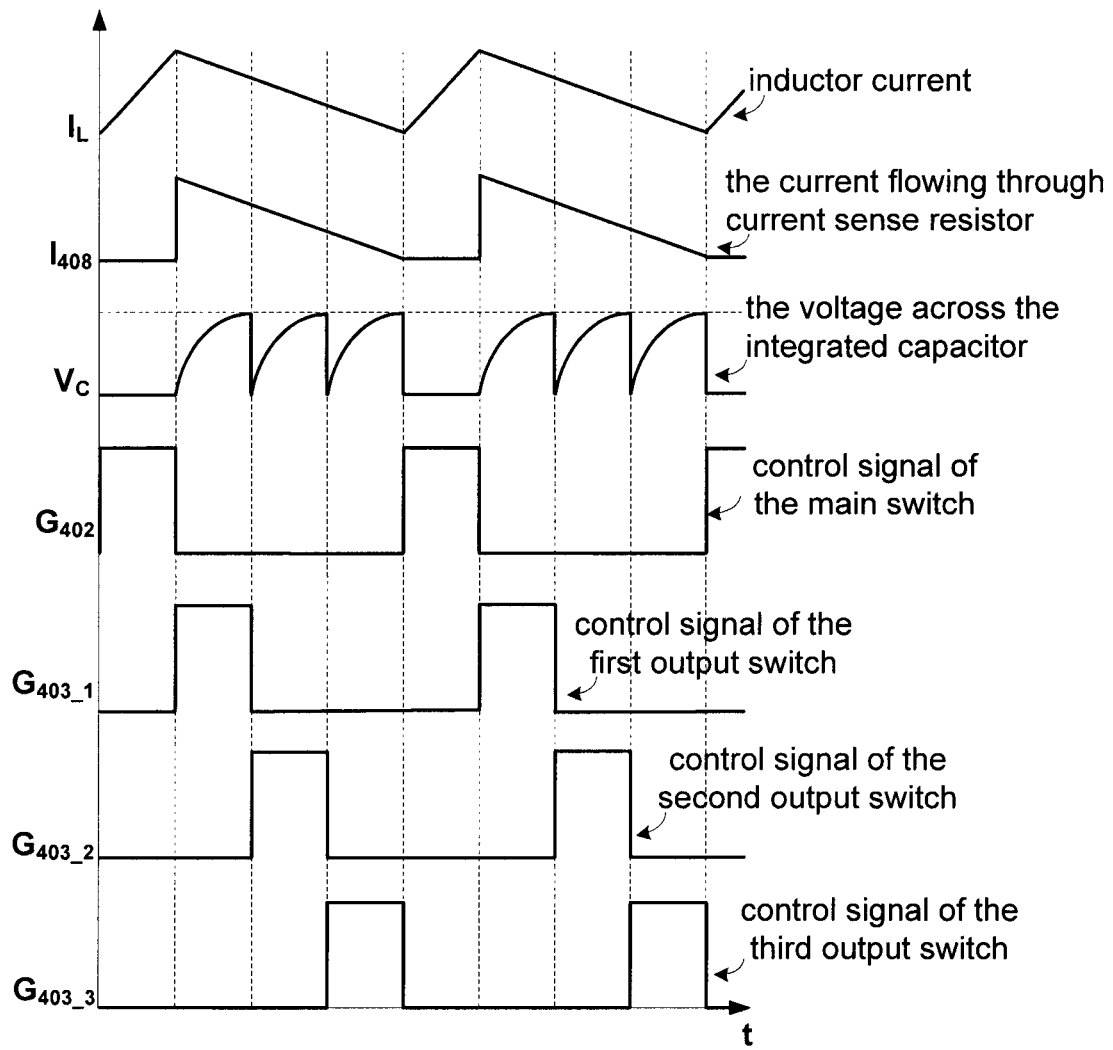
FIG. 10 illustrates waveforms of the inductor current ($I_L$), the current flow through the balance resistor ($I_{408}$), the voltage across the integrated capacitor ($V_C$), the control signal of the main switch ($G_{402}$), and the control signals ($G_{403\_1}$, $G_{403\_2}$, and $G_{403\_3}$) of the output switches when the LED driving system 400 in FIG. 8 operates under the second control scheme in all mode in accordance with an embodiment of the present disclosure.

If the second control scheme is applied, i.e., the main switch 402 and the output switch 403_1 are turned on one by one. The operation of the LED driving system 400 is similar. The waveforms of the inductor current ($I_L$), the current signal ($I_{408}$), the integrated signal ($V_C$), the control signal ($G_{402}$) of the main switch 402, and the control signals ($G_{403\_1}$~$G_{403\_3}$) of the output switches 403_1~403_3 are shown in FIG. 10 when the LED driving system 400 operates under the second control scheme in all mode.

Figure 11:
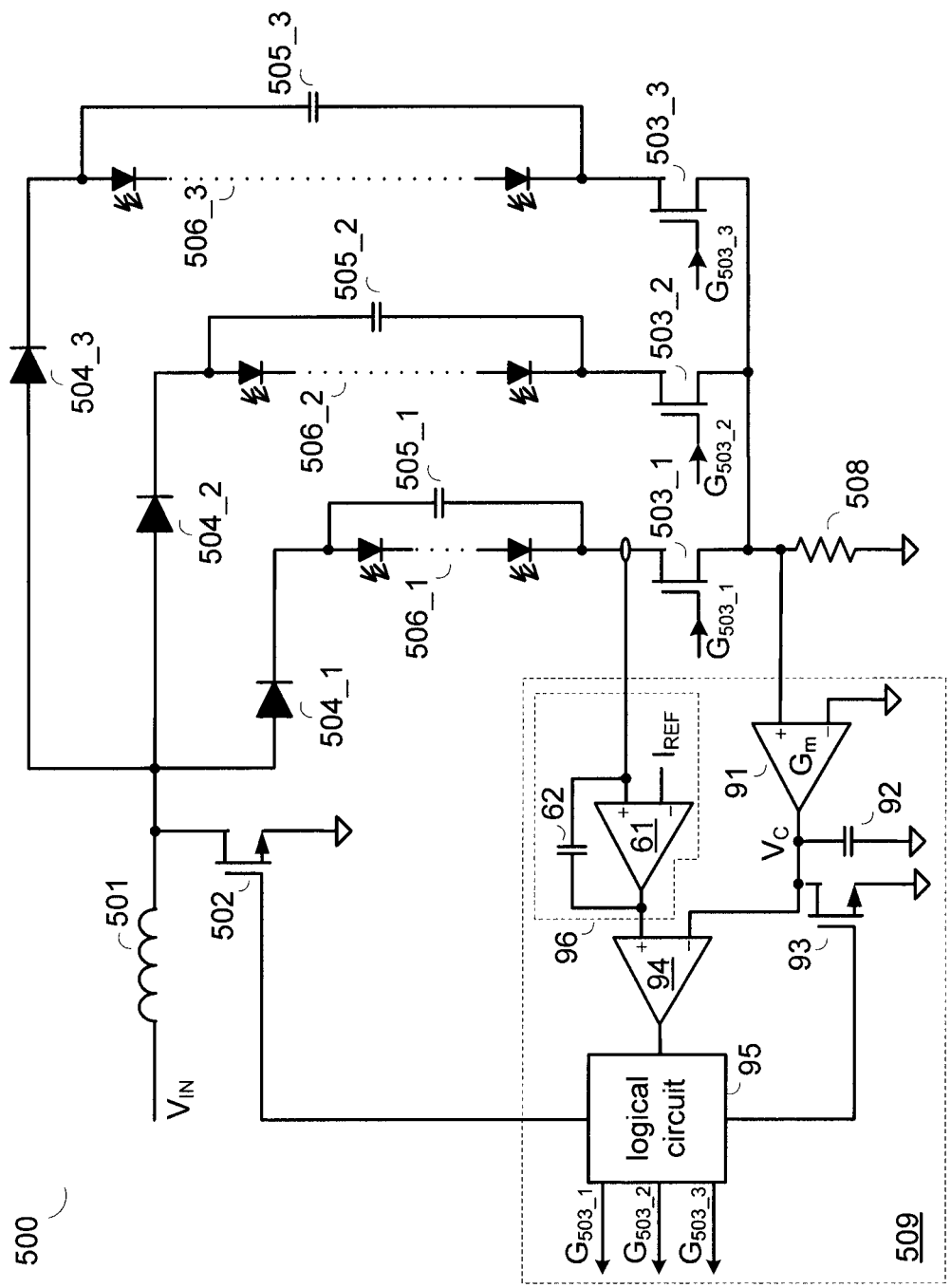
FIG. 11 illustrates a schematic circuit of a LED driving system 500 with a controller 509 in accordance with an embodiment of the present disclosure.

FIG. 11 illustrates a schematic circuit of a LED driving system 500 with a controller 509 in accordance with an embodiment of the present disclosure. The LED driving system 500 is similar to the LED driving system 400. Different to the LED driving system 400 in FIG. 8, the controller 509 in the LED driving system 500 comprises: a transconductance amplifier 91 having a first input terminal, a second input terminal, and an output terminal, wherein the first input terminal is coupled to the current sense resistor 308 to receive the current sense signal, the second input terminal is coupled to the reference ground, wherein based on the current sense signal, the transconductance amplifier 91 generates an amplified signal; an integrated capacitor 92 coupled to the output terminal of the transconductance amplifier 91 to receive the amplified signal, so as to generate an integrated signal $V_C$; a reset switch 93 coupled in parallel with the integrated capacitor 92 to reset the integrated signal $V_C$ when the integrated signal $V_C$ reaches an adjusted current reference; a current reference net 96 having a first input terminal, a second input terminal and an output terminal, wherein the first input terminal is configured to receive a current sample signal indicative of the current flowing through the LED string 506_i, the second input terminal is coupled to a current reference signal $I_{REF}$, and wherein based on the current sample signal and the current reference signal $I_{REF}$, the current reference net 96 generates the adjusted current reference; a comparator 94 having a first input terminal, a second input terminal and an output terminal, wherein the first input terminal is coupled to integrated capacitor 92 to receive the integrated signal $V_C$, the second terminal is coupled to the output terminal of the current reference net 96 to receive the adjusted current reference, wherein based on the integrated signal $V_C$ and the adjusted current reference, the comparator 94 generates a comparison signal; and a logical circuit 95 coupled to the comparator 94 to receive the comparison signal, and wherein based on the comparison signal, the logical circuit 95 generates control signals to the reset switch 93, the main switch 402, and the output switch 403_i.

In one embodiment, the current reference net 96 comprises an error amplifier 61 a first input terminal, a second input terminal and an output terminal, wherein the first input terminal is configured to receive the current sample signal, the second input terminal is configured to receive the current reference signal $I_{REF}$, and wherein based on the current sample signal and the current reference signal $I_{REF}$, the error amplifier 61 generates the adjusted current reference; and a compensation capacitor 62 coupled between the first input terminal of the error amplifier 61 and the output terminal of the error amplifier 61.

The operation of the LED driving system 500 in FIG. 11 is similar to the LED driving system 400 in FIG. 8.

Several embodiments of the foregoing LED driving system provide LED current balance between different LED strings with reduced power loss and cost compared to conventional technique discussed above. Unlike the conventional technique, several embodiments of the foregoing LED driving system only need one feedback control and only one switch is on during the operation of the LED driving system, which leads to high efficiency and minimal external components.

Figure 12:
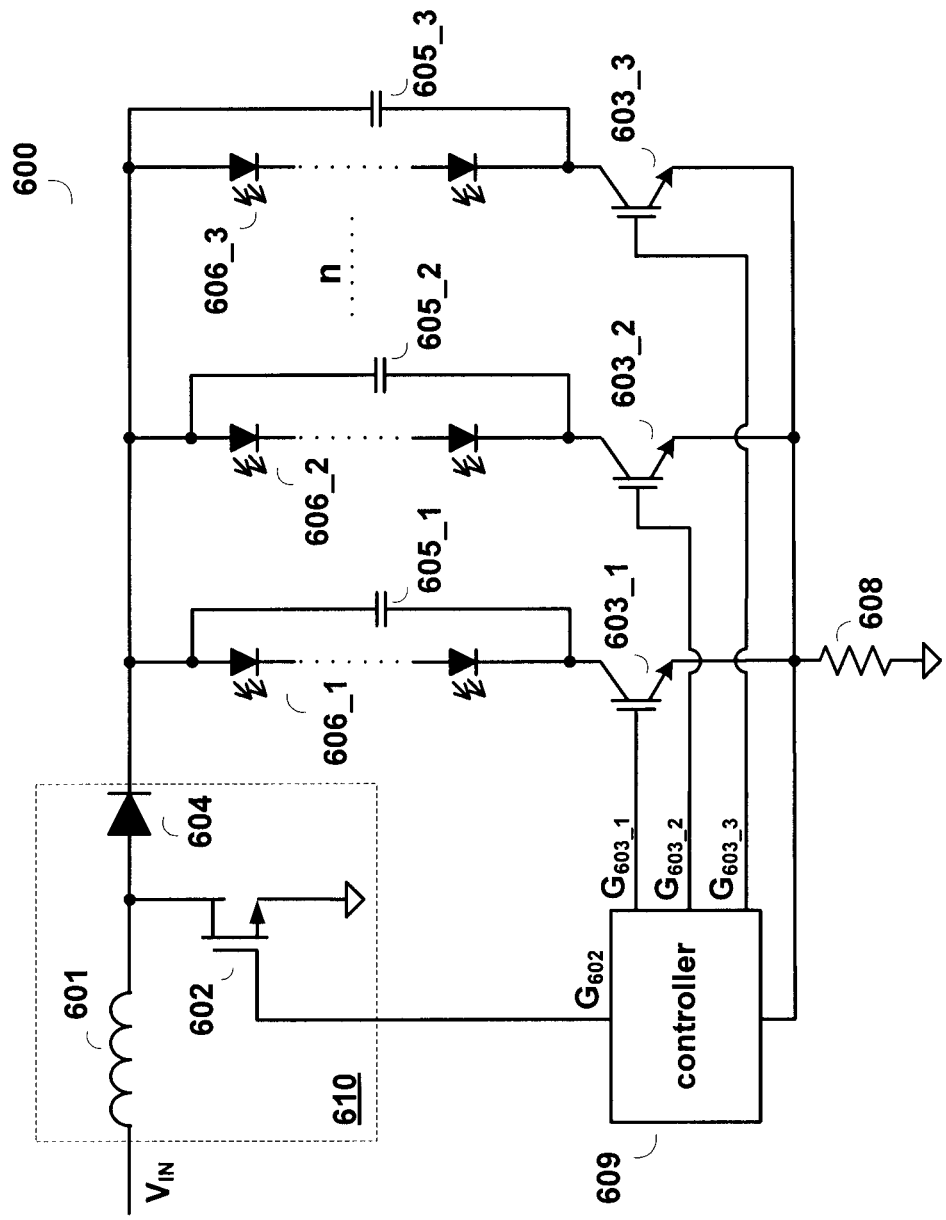
FIG. 12 illustrates a schematic circuit of a LED driving system 600 in accordance with an embodiment of the present disclosure.

FIG. 12 illustrates a schematic circuit of a LED driving system 600 in accordance with an embodiment of the present disclosure. In the example of FIG. 12, the LED driving system 600 comprises: an input port configured to receive an input signal ($V_{IN}$); a power converter 610 comprising a main switch 602 operating at on and off states, wherein the power converter 610 is coupled to the input port to receive the input signal ($V_{IN}$), and wherein based on the on and off states of the main switch 602 and the input signal ($V_{IN}$), the power converter 610 generates a driving voltage; n output lines coupled in parallel to form a first terminal and a second terminal, wherein n is a natural number, and wherein the first terminal is coupled to the power converter 610 to receive the driving voltage, and each output line comprises: a LED string 606_i and an output switch 603_i coupled in series between the first terminal and the second terminal of each output line; and a capacitor 605_i coupled in parallel with the LED string 606_i; a current sense resistor 608 coupled between the second terminal of the n output lines and a reference ground to generate a current sense signal indicative of a current flowing through the LED string 606_i; and a controller 609 coupled to the current sense resistor 608 to receive the current sense signal, and wherein based on the current sense signal, the controller 609 generates control signals to control the main switch 602 and the output switches operate at on and off states to regulate the current flowing through each LED string to be balanced; wherein the output switch 603_i comprises an IGBT (insulated-gate bipolar transistor).

In one embodiment, the power converter 610 further comprises an inductor 601 having a first terminal and a second terminal, wherein the first terminal is coupled to the input port to receive the input signal $V_{IN}$; and a diode 604 coupled between the second terminal of the inductor 601 and the first terminal of the output lines. The main switch 602 is coupled between the second terminal of the inductor 601 and the reference ground.

In the example of FIG. 12, the output switch 603_i is configured to be a low-side output switch. However, one skilled in the art should realize that in other embodiment, the output switch may be configured to be a high-side output switch.

In one embodiment, the controller 609 in the LED driving system in FIG. 12 is configured similar to the controller 409 in the LED driving system in FIG. 8, and the first control scheme or the second control scheme may be applied.

Figure 13:
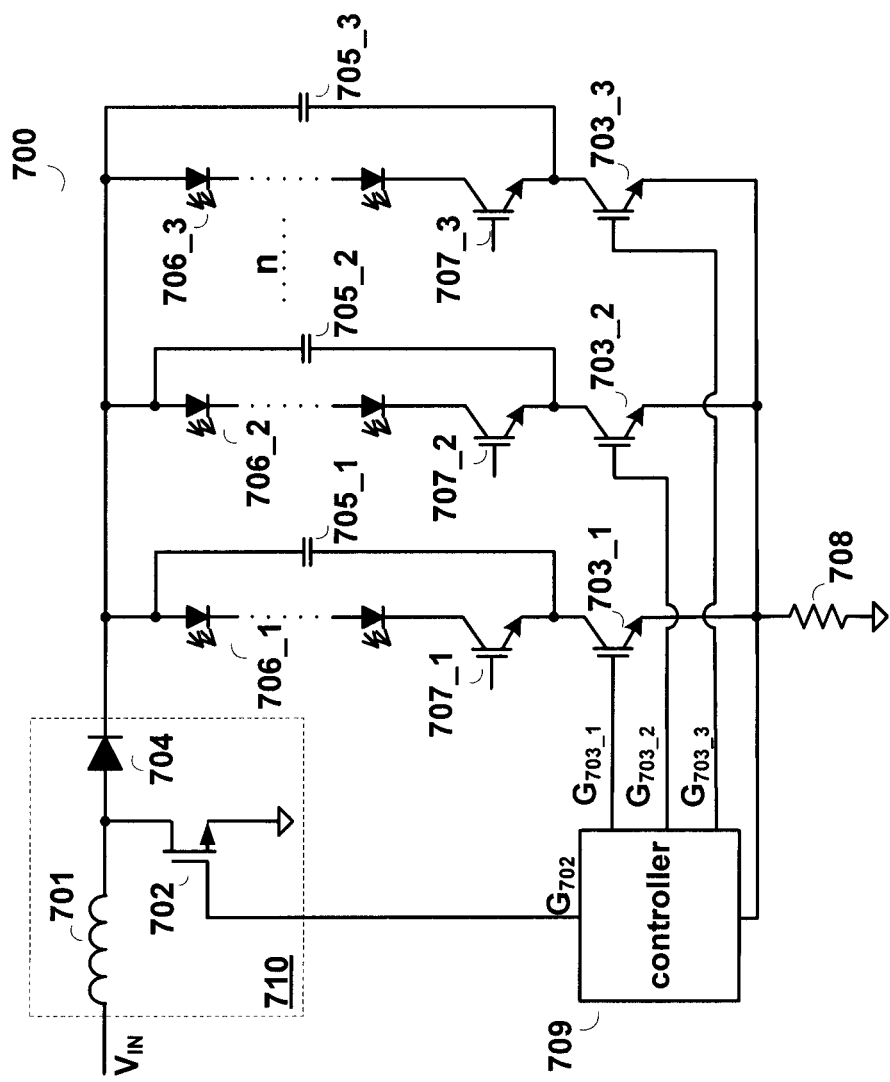
FIG. 13 illustrates a schematic circuit of a LED driving system 700 in accordance with an embodiment of the present disclosure.

FIG. 13 illustrates a LED driving system 700 in accordance with an embodiment of the present disclosure. In the example of FIG. 13, each output line further comprises a dimming switch 707_i coupled in series with the LED string 706_i, wherein the series coupled LED string 706_i and dimming switch 707_i is coupled in parallel with the capacitor 705_i.

Since there is no parasitic diode in an IGBT, the output lines comprises no diode which is used to avoid reverse current. Accordingly, the LED driving system 600/700 further minimizes external components.

Figure 14:
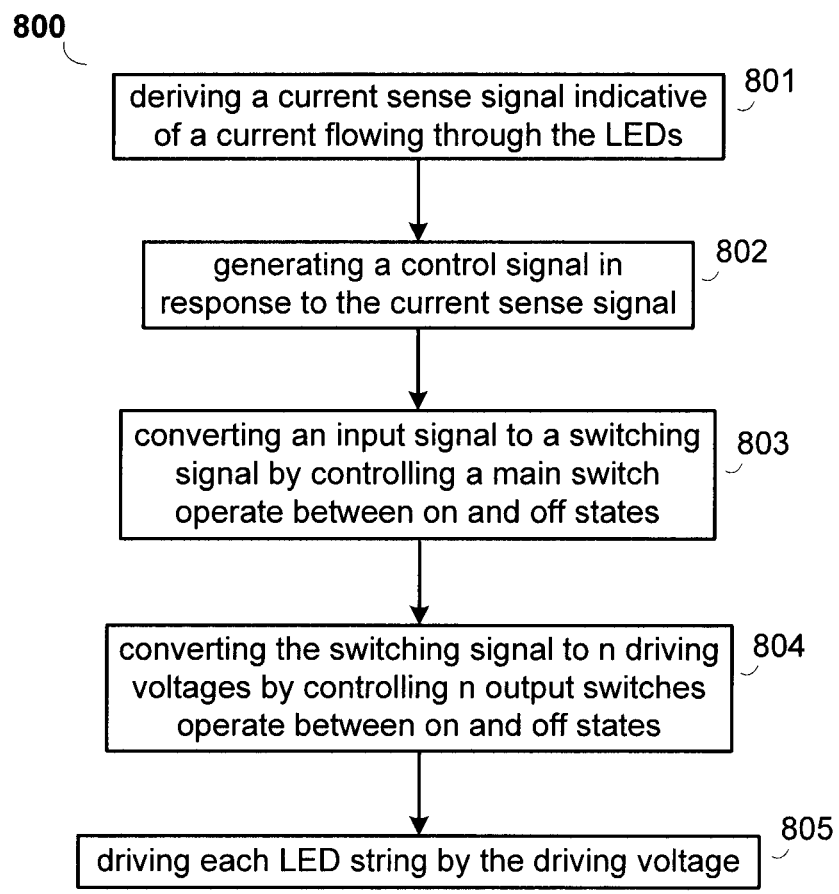
FIG. 14 schematic shows a flowchart 800 of a method for driving multi-string LEDs in accordance with an embodiment of the present disclosure.

FIG. 14 schematic shows a flowchart 800 of a method for driving multi-string LEDs in accordance with an embodiment of the present disclosure. The method comprises:

Step 801, deriving a current sense signal indicative of a current flowing through the LEDs.

Step 802, generating a control signal in response to the current sense signal.

Step 803, converting an input signal to a switching signal by controlling a main switch to operate between on and off states.

Step 804, converting the switching signal to n driving voltages by controlling n output switches to operate between on and off states, wherein n is the LED string number, and wherein each output switch is coupled in series with each LED string. And Step 805, driving each LED string by the driving voltage; wherein the main switch and the output switches are controlled by the control signal.

In one embodiment, the step of generating a control signal in response to the current sense signal comprises: amplifying the current sense signal to generate an amplified signal; integrating the amplified signal to generate an integrated signal; comparing the integrated signal with an current reference to generate a comparison signal; resetting the integrated signal if the integrated signal reaches an current reference; and generating the control signal in response to the comparison signal.

In one embodiment, the main switch and the output switches are controlled to be turned on alternatively, that is, the turn-on order of the main switch and each of the corresponding output switches is: the main switch, the first switch; the main switch, the second switch; . . . ; the main switch, the (n−1) switch; the main switch, and the n switch.

In one embodiment, the main switch and the output switches are controlled to be turned on one by one, that is: the turn-on order of the main switch and each of the corresponding output switches is: the main switch, the first output switch, the second output switch, . . . , the (n−1) output switch, and the n output switch.

This written description uses examples to disclose the disclosure, including the best mode, and also to enable a person skilled in the art to make and use the disclosure. The patentable scope of the disclosure may include other examples that occur to those skilled in the art.

I claim:

1. A LED driving system for driving multi-string LEDs, comprising:
an input port configured to receive an input signal;
a switch node configured to provide a switching signal;
an energy storage component coupled between the input port and the switch node;
a main switch coupled between the switch node and a reference ground;
n output lines coupled in parallel, wherein n is a natural number, and each output line having a first terminal and a second terminal, wherein each output line having an output switch, a diode and a LED string coupled in series between the first and second terminals, and wherein each output line having a capacitor coupled in parallel with the LED string, and wherein all the first terminals are coupled together to the switch node, and all the second terminals are coupled together to the reference ground via a current sense resistor, the current sense resistor configured to provide a current sense signal indicative of the current flowing through the LED string when a corresponding output switch of the LED string is on; and
a controller configured to provide a control signal to the main switch and to provide corresponding n control signals to the corresponding n output switches in the corresponding n output lines; and wherein the controller further comprises:
a transconductance amplifier having a first input terminal, a second input terminal, and an output terminal, wherein the first input terminal is coupled to the current sense resistor to receive the current sense signal, the second input terminal is coupled to the reference ground, wherein based on the current sense signal, the transconductance amplifier generates an amplified signal;
an integrated capacitor coupled to the output terminal of the transconductance amplifier to receive the amplified signal, to generate an integrated signal;
a reset switch coupled in parallel with the integrated capacitor to reset the integrated signal to be zero when the integrated signal reaches a current reference signal;
a comparator having a first input terminal, a second input terminal and an output terminal, wherein the first input terminal is coupled to integrated capacitor to receive the integrated signal, the second terminal is configured to receive the current reference signal, wherein based on the integrated signal and the current reference signal, the comparator generates a comparison signal; and a logical circuit coupled to the comparator to receive the comparison signal, and wherein based on the comparison signal, the logical circuit generates control signals to the reset switch, the main switch, and the output switch.

2. The LED driving system of claim 1, wherein the turn-on order of the main switch and each of the corresponding output switches is:
the main switch, the first switch; the main switch, the second switch; . . . ; the main switch, the (n−1) switch; the main switch, and the n switch.

3. The LED driving system of claim 1, wherein the turn-on order of the main switch and each of the corresponding output switches is:
the main switch, the first output switch, the second output switch, . . . , the (n−1) output switch, and the n output switch.

4. The LED driving system of claim 1, wherein each output line further comprise a dimming switch coupled in series with the LED string, wherein the series coupled LED string and dimming switch is coupled in parallel with the capacitor.

5. The LED driving system of claim 1, wherein the controller further comprises:
a current reference net having a first input terminal, a second input terminal and an output terminal, wherein the first input terminal is configured to receive a current sample signal indicative of the current flowing through the LED string, the second input terminal is coupled to the current reference signal, and wherein based on the current sample signal and the current reference signal, the current reference net generates an adjusted current reference;
wherein the second terminal of the comparator is coupled to the output terminal of the current reference net to receive the adjusted current reference signal, and wherein the comparator generates the comparison signal based on the integrated signal and the current reference signal.

6. The LED driving system of claim 5, wherein the current reference net comprises:
an error amplifier a first input terminal, a second input terminal and an output terminal, wherein the first input terminal is configured to receive the current sample signal, the second input terminal is configured to receive the current reference signal, and wherein based on the current sample signal and the current reference signal, the error amplifier generates the adjusted current reference; and
a compensation capacitor coupled between the first input terminal of the error amplifier and the output terminal of the error amplifier.

7. The LED driving system of claim 1, wherein the output switch is configured to be a high-side output switch.

8. The LED driving system of claim 1, wherein the output switch is configured to be a low-side output switch.

9. A LED driving system, comprising:
an input port configured to receive an input signal;
a power converter comprising a main switch operating at on and off states, wherein the power converter is coupled to the input port to receive the input signal, and wherein based on the on and off states of the main switch and the input signal, the power converter generates a driving voltage;
n output lines coupled in parallel to form a first terminal and a second terminal, wherein n is a natural number, and wherein the first terminal is coupled to the power converter to receive the driving voltage, and each output line comprises: a LED string and an output switch coupled in series between the first terminal and the second terminal of each output line; and a capacitor coupled in parallel with the LED string;
a current sense resistor coupled between the second terminal of the n output lines and a reference ground to generate a current sense signal indicative of a current flowing through the LED string; and
a controller coupled to the current sense resistor to receive the current sense signal, and wherein based on the current sense signal, the controller generates control signals to control the main switch and the output switches operate at on and off states to regulate the current flowing through each LED string to be balanced; and wherein the controller further comprises:
a transconductance amplifier having a first input terminal, a second input terminal, and an output terminal, wherein the first input terminal is coupled to the current sense resistor to receive the current sense signal, the second input terminal is coupled to the reference ground, wherein based on the current sense signal, the transconductance amplifier generates an amplified signal;
an integrated capacitor coupled to the output terminal of the transconductance amplifier to receive the amplified signal, to generate an integrated signal;
a reset switch coupled in parallel with the integrated capacitor to reset the integrated signal to be zero when the integrated signal reaches a current reference signal;
a comparator having a first input terminal, a second input terminal and an output terminal, wherein the first input terminal is coupled to integrated capacitor to receive the integrated signal, the second terminal is configured to receive the current reference signal, wherein based on the integrated signal and the current reference signal, the comparator generates a comparison signal; and
a logical circuit coupled to the comparator to receive the comparison signal, and wherein based on the comparison signal, the logical circuit generates control signals to the reset switch, the main switch, and the output switch.

10. The LED driving system of claim 9, wherein the output switch comprises an IGBT.

11. The LED driving system of claim 9, wherein each output line further comprises a dimming switch coupled in series with the LED string, wherein the series coupled LED string and dimming switch is coupled in parallel with the capacitor.

12. The LED driving system of claim 9, wherein the controller comprises:
a current reference net having a first input terminal, a second input terminal and an output terminal, wherein the first input terminal is configured to receive a current sample signal indicative of the current flowing through the LED string, the second input terminal is coupled to the current reference signal, and wherein based on the current sample signal and the current reference signal, the current reference net generates an adjusted current reference;
wherein the second terminal of the comparator is coupled to the output terminal of the current reference net to receive the adjusted current reference signal, and wherein the comparator generates the comparison signal based on the integrated signal and the current reference signal.

13. The LED driving system of claim 9, wherein the output switch is configured to be a low-side output switch.

14. A method for driving multi-string LEDs, comprising:
deriving a current sense signal indicative of a current flowing through a LED string with a current sense resistor;
generating a control signal in response to the current sense signal;
converting an input signal to a switching signal by controlling a main switch to operate between on and off states;
converting the switching signal to n driving voltages by controlling n output switches to operate between on and off states, wherein n is the LED string number, and wherein each output switch is coupled in series with each LED string; and
driving each LED string by the driving voltage; wherein the main switch and the output switches are controlled by the control signal; and wherein the step of generating a control signal in response to the current sense signal comprises:
amplifying the current sense signal to generate an amplified signal;
integrating the amplified signal to generate an integrated signal;
comparing the integrated signal with a current reference to generate a comparison signal;
resetting the integrated signal if the integrated signal reaches a current reference; and
generating the control signal in response to the comparison signal.

15. The method of claim 14, wherein the main switch and the output switches are controlled to be turned on alternatively.

16. The method of claim 14, wherein the main switch and the output switches are controlled to be turned on one by one.

* * * * *